United States Patent
Yi et al.

(10) Patent No.: US 10,678,800 B2
(45) Date of Patent: Jun. 9, 2020

(54) RECOMMENDATION PREDICTION BASED ON PREFERENCE ELICITATION

(71) Applicant: International Business Machines Corporation, Armonk, NY (US)

(72) Inventors: Jinfeng Yi, Ossining, NY (US); Jun Wang, White Plains, NY (US); Kush Varshney, Ossining, NY (US); Aleksandra Mojsilovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/849,214

(22) Filed: Dec. 20, 2017

(65) Prior Publication Data

US 2019/0188274 A1    Jun. 20, 2019

(51) Int. Cl.
  *G06F 16/2457*  (2019.01)
  *G06Q 30/06*    (2012.01)
  *G06F 17/16*    (2006.01)
  *G06F 17/18*    (2006.01)
  *G06F 16/9535*  (2019.01)

(52) U.S. Cl.
  CPC .... *G06F 16/24578* (2019.01); *G06F 16/9535* (2019.01); *G06F 17/16* (2013.01); *G06F 17/18* (2013.01); *G06Q 30/0631* (2013.01)

(58) Field of Classification Search
  USPC ......................................................... 707/748
  See application file for complete search history.

(56) References Cited

U.S. PATENT DOCUMENTS

| | | | |
|---|---|---|---|
| 7,188,106 B2 | 3/2007 | Dwork et al. |
| 7,680,703 B1 | 3/2010 | Smith |
| 8,117,085 B1 | 2/2012 | Smith |
| 8,131,732 B2 | 3/2012 | Yu et al. |
| 8,234,183 B2 | 7/2012 | Smith |

(Continued)

OTHER PUBLICATIONS

Bian et al., "A Method of Using a Pairwise Learning Model in an Online Recommendation System"; Mar. 29, 2012; Database: ip.com; ip.com No. IPCOM000216302D.

(Continued)

*Primary Examiner* — Hung T Vy
(74) *Attorney, Agent, or Firm* — Scully, Scott, Murphy & Presser, P.C.; Daniel P. Morris, Esq.

(57) ABSTRACT

Methods and systems for generating prediction data are described. In an example, a processor may retrieve preferential data from a memory. The preferential data may include a set of preferences that corresponds to a first subset of objects among a set of objects, and may exclude preferences associated with a second subset of objects among the set of objects. Each preference may indicate a preferred object between a respective pair of objects among the first subset of objects. The processor may determine first predicted ratings corresponding to the first subset of objects based on the preferential data. The processor may determine second predicted ratings corresponding to the second subset of objects based on the preferential data. The processor may generate prediction data by populating entries of the prediction data with the first and second predicted ratings, where the prediction data may include predicted ratings of the set of objects.

17 Claims, 5 Drawing Sheets

(56) References Cited

U.S. PATENT DOCUMENTS

| | | |
|---|---|---|
| 8,407,178 B2 | 3/2013 | Hicks |
| 2009/0210246 A1* | 8/2009 | Patel ..................... G06Q 30/02 705/319 |
| 2010/0268661 A1 | 10/2010 | Levy et al. |
| 2012/0143802 A1 | 6/2012 | Balakrishnan et al. |
| 2013/0218914 A1 | 8/2013 | Stavrianou et al. |

OTHER PUBLICATIONS

Srebro et al., "Maximum-Margin Matrix Factorization", Advances in Neural Information Processing Systems 17, Proceedings of the 2004 Conference;, May 2005, ISBN: 9780262195348.

Salakhutdinov et al., Probalisitic Matrix Factorization, NIPS'07 Proceedings of the 20th International Conference on Neutral Information Processing Systems, Vancouver, British Columbia, Canada, Dec. 3-6, 2007, ISBN: 978-1-60560-352-0, pp. 1257-1264.

Rendle et al., "BPR: Bayesian Personalized Ranking from Implicit Feedback", UAI'09 Proceedings of the Twenty-Fifth Conference on Uncertainty in Artificial Intelligence, Montreal, Quebec, Canada, Jun. 18-21, 2009, ISBN: 978-0-9749039-5-8, pp. 452-461.

Liu et al., "Probabilistic Latent Preference Analysis for Collaborative Filtering", CIKM'09, Nov. 2-6, 2009, Hong Kong, China, ACM 978-1-60558-512-3/09/11, pp. 759-766.

\* cited by examiner

RECOMMENDATION PREDICTION BASED ON PREFERENCE ELICITATION

FIELD

The present application relates generally to computers, and computer applications, and more particularly to computer-implemented methods and systems for recommendation prediction.

BACKGROUND

A recommendation system may receive an input from a user and, in response, may use the received input to generate an output related to a recommendation for the user. In some examples, the input may relate to a score of an item, or a piece of media content, etc. In some examples, the output may relate to a recommendation prediction to purchase one or more particular items, or to view one or more pieces of particular media content, etc.

SUMMARY

In some examples, methods for generating prediction data in a recommendation system are generally described. The methods may include retrieving, by a processor of the recommendation system, preferential data from a memory. The preferential data may indicate a set of preferences that corresponds to a first subset of objects among a set of objects. Each preference among the set of preferences may be indicative of a preferred object between a respective pair of objects among the first subset of objects. The preferential data may exclude preferences associated with a second subset of objects among the set of objects. The methods may further include determining, by the processor of the recommendation system and based on the preferential data, first predicted ratings that corresponds to the first subset of objects. The methods may further include determining, by the processor of the recommendation system and based on the preferential data, second predicted ratings that corresponds to the second subset of objects. The methods may further include generating, by the processor of the recommendation system, the prediction data by populating entries of the prediction data with the first predicted ratings and the second predicted ratings. The prediction data may include predicted ratings of the set of objects.

In some examples, systems effective to generate prediction data are generally described. The systems may include a memory configured to store a prediction instruction. The systems may further include a prediction module configured to be in communication with the memory. The prediction module may be configured to retrieve preferential data from the memory. The preferential data may indicate a set of preferences that corresponds to a first subset of objects among a set of objects. Each preference among the set of preferences may be indicative of a preferred object between a respective pair of objects among the first subset of objects. The preferential data may exclude preferences associated with a second subset of objects among the set of objects. The prediction module may be further configured to determine, based on the preferential data, first predicted ratings that corresponds to the first subset of objects. The prediction module may be further configured to determine, based on the preferential data, second predicted ratings that corresponds to the second subset of objects. The prediction module may be further configured to populate entries of the prediction data with the first predicted ratings and the second predicted ratings to generate the prediction data. The prediction data may include predicted ratings of the set of objects.

In some examples, computer program products for generating prediction data in a recommendation system are generally described. The computer program products may include a computer readable storage medium having program instructions embodied therewith. The program instructions may be executable by a device to cause the device to retrieve preferential data from a memory. The preferential data may include a set of preferences that corresponds to a first subset of objects among a set of objects. Each preference among the set of preferences may be indicative of a preferred object between a respective pair of objects among the first subset of objects. The preferential data may exclude preferences associated with a second subset of objects among the set of objects. The program instructions may be further executable by a device to cause the device to determine, based on the preferential data, first predicted ratings that corresponds to the first subset of objects. The program instructions may be further executable by a device to cause the device to determine, based on the preferential data, second predicted ratings that corresponds to the second subset of objects. The program instructions may be further executable by a device to cause the device to generate the prediction data by populating entries of the prediction data with the first predicted ratings and the second predicted ratings. The prediction data may include predicted ratings of the set of objects.

Further features as well as the structure and operation of various embodiments are described in detail below with reference to the accompanying drawings. In the drawings, like reference numbers indicate identical or functionally similar elements.

DETAILED DESCRIPTION

Briefly stated, methods and systems for generating prediction data are described. In an example, a processor may retrieve preferential data from a memory. The preferential data may include a set of preferences that corresponds to a first subset of objects among a set of objects, and may exclude preferences associated with a second subset of objects among the set of objects. Each preference may indicate a preferred object between a respective pair of objects among the first subset of objects. The processor may determine first predicted ratings corresponding to the first subset of objects based on the preferential data. The processor may determine second predicted ratings corresponding to the second subset of objects based on the preferential data. The processor may generate prediction data by populating entries of the prediction data with the first and second predicted ratings, where the prediction data may include predicted ratings of the set of objects.

Figure 1:
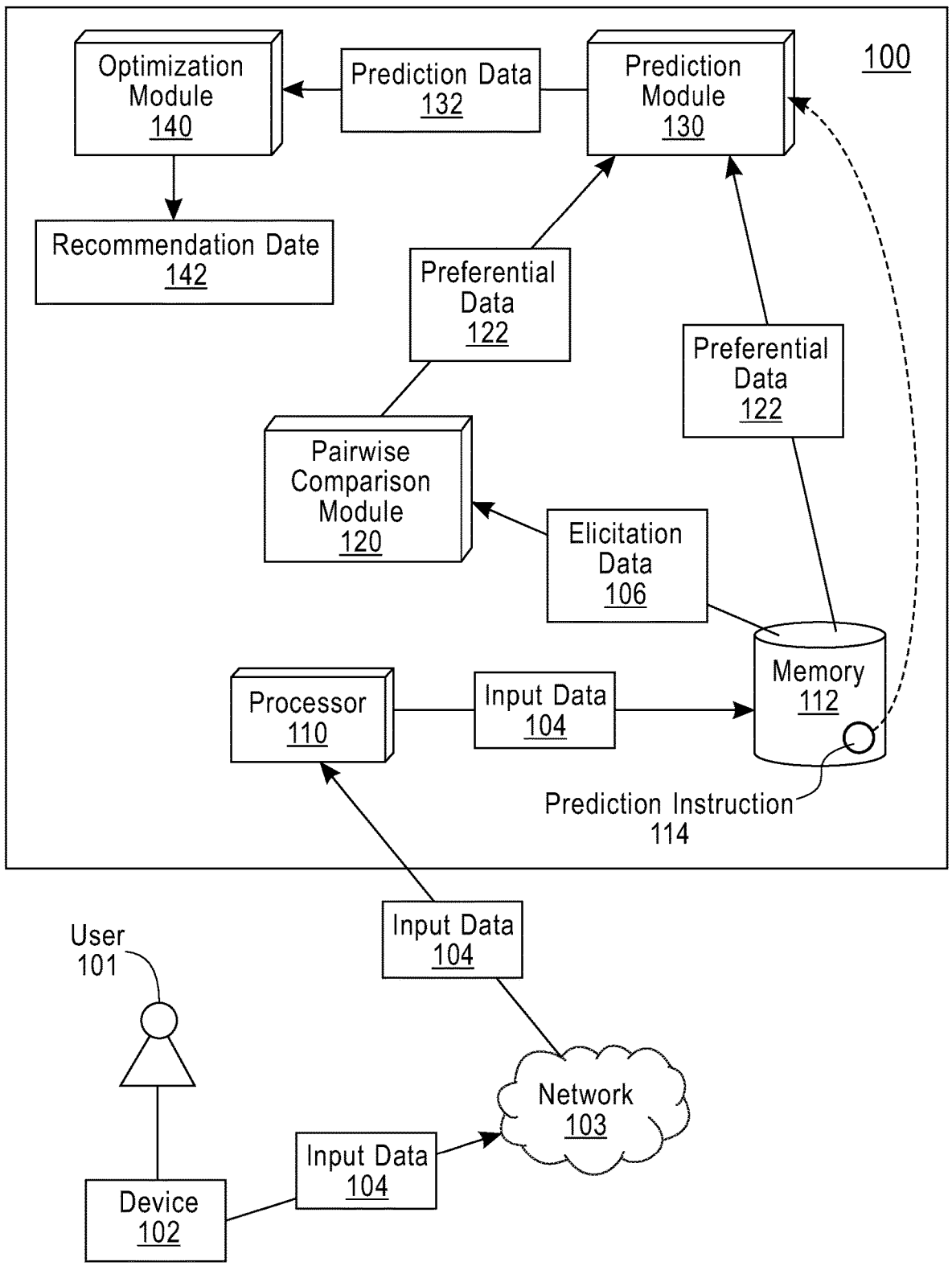
FIG. 1 illustrates an example computer system that can be utilized to implement recommendation prediction with preference elicitation.

FIG. 1 illustrates an example computer system 100 that can be utilized to implement recommendation prediction based on preference elicitation, arranged in accordance with at least some embodiments described herein. In some examples, system 100 may be a recommendation system for an entity, such as an online retailer, a media content streaming website, a social media platform, etc. In an example shown in FIG. 1, computer system 100 may include a processor 110, a memory 112, a pairwise comparison module 120, a prediction module 130, and/or an optimization module 140. Processor 110, memory 112, pairwise comparison module 120, prediction module 130, and optimization module 140 may be configured to be in communication with each other. In some examples, processor 110, memory 112, pairwise comparison module 120, prediction module 130, and optimization module 140 may be housed, or distributed, in a same housing and/or a computer device. In some examples, processor 110, memory 112, pairwise comparison module 120, prediction module 130, and optimization module 140 may be housed, or distributed, in two or more different housings and/or computer devices. For example, processor 110 and memory 112 may be distributed in a first housing and pairwise comparison module 120, prediction module 130, and optimization module 140 may be distributed in a second housing. In another example, processor 110 may be a processor of a first device, and pairwise comparison module 120, prediction module 130, and optimization module 140 may be components of a second device different from the first device.

In another embodiment, processor 110, memory 112, pairwise comparison module 120, prediction module 130, and optimization module 140 may each be hardware components or hardware modules of computer system 100. In some examples, pairwise comparison module 120, prediction module 130, and optimization module 140 may each be a hardware component, or hardware modules, of processor 110. In some examples, processor 110 may be a central processing unit of a computer device. In some examples, processor 110 may control operations of pairwise comparison module 120, prediction module 130, and optimization module 140. In some examples, pairwise comparison module 120, prediction module 130, and optimization module 140 may each include electronic components, such as integrated circuits. In some examples, pairwise comparison module 120, prediction module 130, and optimization module 140 may each be processors configured to perform respective operations. In some examples, pairwise comparison module 120, prediction module 130, and optimization module 140 may each be an embedded system, programmable devices such as field-programmable-gate-array (FPGA), or other types of application specific integrated circuits (ASIC), etc. In some examples, pairwise comparison module 120, prediction module 130, and optimization module 140 may each be software modules that may be implemented with processor 110.

Memory 112 may be configured to store a prediction instruction 114. Prediction instruction 114 may include one or more set of instructions to facilitate implementation of computer system 100. In some examples, prediction instruction 114 may include instructions to apply matrix completion techniques, pairwise comparison techniques, loss functions, gradient descent methods such as stochastic subgradient descend methods, etc. to a set of inputs received at computer system 100. In some examples, prediction instruction 114 may indicate one or more conditions or constraints associated with an implementation of computer system 100. Processor 110, pairwise comparison module 120, prediction module 130, and optimization module 140 may each retrieve prediction instruction 114 from memory 112, and may each execute prediction instruction 114 to facilitate implementation of computer system 100.

In an example, memory 112 may be further configured to store preferential data 122. Preferential data 122 may include data that indicates preferences of one or more objects, where the preferences may be indicated by one or more users of computer system 100 (details of preferential data 122 will be described in more detail below). Some examples of objects may include items available for purchase from an online retailer, media content available for streaming or download from an online content provider, user profiles of one or more users of a social networking platform, webpages, new articles, indications of particular skills, etc. In some examples, memory 112 may be a memory of a server in a cloud computing platform.

In some examples, preferential data 122 may be based on input data 104, where input data 104 may be data and/or information provided by one or more devices controlled by one or more users of computer system 100. For example, a user 101 may use a device 102 to provide input data 104 to computer system 100, such that input data 104 may be stored in memory 112. Device 102 may be a computing device such as a desktop computer, laptop computer, cellular phone, tablet device, wearable device, etc. Device 102 may be configured to be in communication with computer system 100 through a network 103. Network 103 may be the Internet, a cellular network, etc. User 101 may operate device 102 to generate input data 104 and to send input data 104 to computer system 100 through network 103. In some examples, device 102 may send input data 104 to processor 110 and processor 110 may be configured to store input data 104 in memory 112.

Input data 104 may include data associated with activities of user 101, and/or preferences of one or more objects indicated by user 101. For example, input data 104 may include data indicating a duration of time in which user 101 viewed one or more webpages. In another example, user 101 may operate device 102 to select a first object over a second object in order to indicate a preference of the first object over the second object. In another example, input data 104 may include data indicating a history of transactions performed by user 101 on a particular online retailer. In another example, user 101 may view ten items that may be purchased from an online retailer, and may select a particular item among the ten items to purchase from the online retailer. Input data 104 may indicate that user 101 selected the particular item among the ten items.

Processor 110 may receive input data 104 from device 102 at one or more times, and may store input data 104 in memory 112. In some examples, processor 110 may sort input data 104 prior to storing input data 104 in memory 112. For example, processor 110 may store input data that corresponds to an online shopping history in a first portion of memory 112 and may store input data that corresponds to web browsing history in a second portion of memory 112. Processor 110 may further be configured to generate elicitation data 106, where elicitation data 106 may include one or more pieces of input data 104. Elicitation data 106 may be processed by a component of computer system 100 (e.g., processor 110) and, in response, may be outputted as a matrix. In some examples, a portion of memory 112 may be allocated for elicitation data 106, such that processor 110 may distribute appropriate pieces of input data 104 into the memory allocated for elicitation data 106. For example, user 101 may operate device 102 to request a recommendation of purchasable items from an online retailer. Processor 110 may identity input data 104 that corresponds to a shopping history of user 101 and may retrieve the identified input data 104 to be distributed as entries of elicitation data 106. In an example, elicitation data 106 may be outputted as a partially observed matrix, or an incomplete matrix. For example, a matrix being outputted from elicitation data 106 may include some observed, or filled, entries and may also include some empty, or unobserved, entries.

Pairwise comparison module 120 may be configured to retrieve elicitation data 106 from memory 112. As will be described in more detail below, pairwise comparison module 120 may be configured to convert elicitation data 106 into preferential data 122 by executing prediction instruction 114.

Prediction module 130 may receive preferential data 122 and, in response, may execute prediction instruction 114 to generate prediction data 132 based on preferential data 122. As will be described in more detail below, preferential data 122 may include preferences that corresponds to a first subset of objects among a set of objects, and may exclude preferences that corresponds to a second subset of objects among the set of objects. Prediction module 130 may generate prediction data 132 that corresponds to the set of objects, where prediction data 132 may include predicted ratings that corresponds to the set of objects. Prediction data 132 may be processed by a component of computer system 100 (e.g., prediction module 130) and, in response, may be outputted as a matrix. In some examples, a portion of memory 112 may be allocated for prediction data 132. Prediction module 130 may generate prediction data 132 by populating a matrix associated with prediction data 132, or by distributing the determined predicted ratings into corresponding memory spaces allocated for prediction data 132. Prediction data 132 may be outputted as a complete matrix. For example, a matrix being outputted from prediction data 132 may include all entries observed, or filled, which may indicate that prediction data 132 includes predicted ratings for all objects among the set of objects.

Prediction module 130 may send prediction data 132 to optimization module 140, where optimization module 140 may generate recommendation data 142 based on prediction data 132 (further described below). In some examples, recommendation data 142 may include data relating to recommendations for user 101 to purchase particular items from an online retailer, or recommendations for user 101 to select one or more particular pieces of media content (e.g., movies) from a media content provider. In some examples, recommendation data 142 may include data indicating a list of users that rated a particular object within a particular range of rating.

Figure 2:
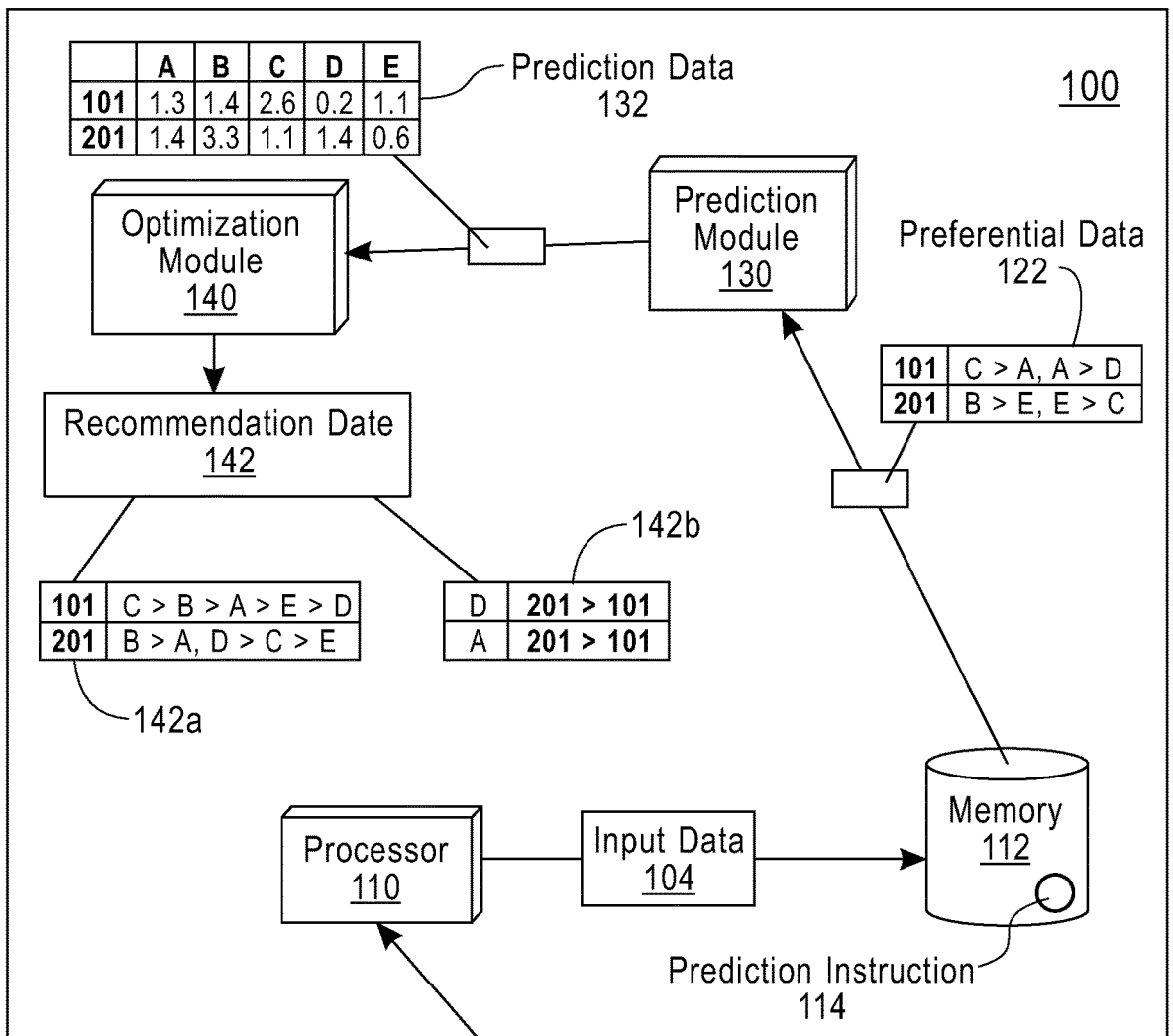
FIG. 2 illustrates the example computer system of FIG. 1 with additional detail relating to recommendation prediction with preference elicitation.
Figure 2:
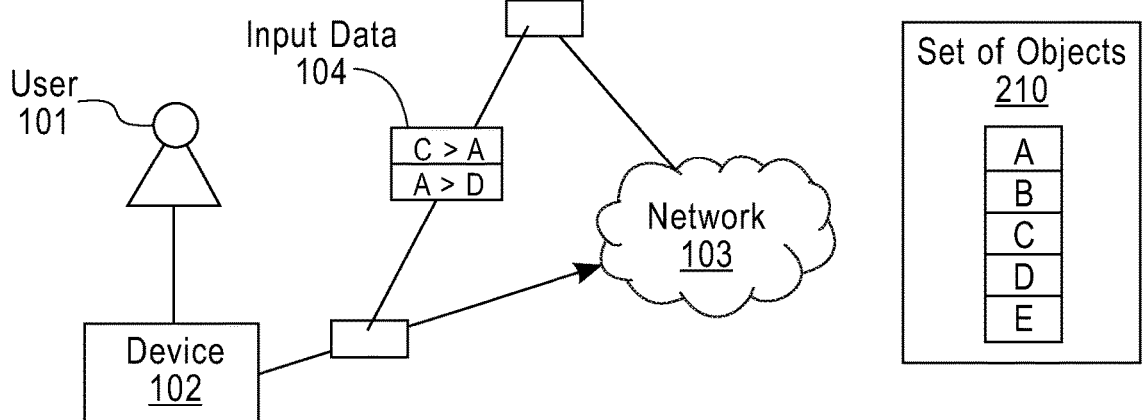

FIG. 2 illustrates the example computer system 100 of FIG. 1 with additional detail relating to recommendation prediction with preference elicitation, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In an example shown in FIG. 2, input data 104 may indicate that user 101 prefers an object "C" over an object "A", and prefers object "A" over an object "D". Subsequently, user 101 may request a recommendation of objects among a set of objects 210, where set of objects 210 may include objects "A", "B", "C", "D", "E". Processor 110 may receive the request from device 102 and, in response, may instruct prediction module 130 to generate prediction data 132 that corresponds to set of objects 210. Prediction module 130 may receive the instruction from processor 110 and, in response, may retrieve preferential data 122, where preferential data 122 may include input data 104 that corresponds to set of objects 210.

In the example shown in FIG. 2, preferential data 122 may include indications of preferred objects between one or more pairs of objects among set of objects 210. For example, preferential data 122 may include indications that user 101 prefers object "C" over object "A", and prefers object "A" over object "D". In some examples, preferential data 122 may include preferences associated with more than one users. For example, preferential data 122 may include indications that a user 201 prefers object "B" over object "E", and prefers object "E" over object "C". Preferential data 122 may exclude preferences from users that correspond to a subset of objects among set of objects 210. For example, preferential data 122 may lack indications of preferences associated with objects "B" and "E" from user 101, and may lack indications of preference associated with objects "A" and "D" from user 201.

Continuing with the example in FIG. 2, prediction module 130 may execute prediction instruction 114 to generate prediction data 132 based on preferential data 122 and conditions that may be indicated by prediction instruction 114. In an example, prediction instruction 114 may include objective functions, where the objective functions may include objectives and constraints relating to an implementation of computer system 100. For example, prediction instruction 114 may include an objective to minimize a matrix rank of a matrix X, where matrix X may be a matrix outputted by processing prediction data 132, such as:

$$\min(\text{rank}(X)) = \min_{X \in \mathbb{R}^{M \times N}} \lambda |X|_*,$$

where:

X may be the matrix that may be outputted by processing prediction data 132, and may be a matrix including M rows and N columns, and $\lambda$ may denote a parameter that may be used to balance terms of an objective function (described below), and $|X|_*$ may denote a trace norm of matrix X.

Prediction instruction 114 may further include instructions relating to a smoothed log-loss function denoted as:

$$\ell_{(o_j > u_i o_k)}(X_{i,j} - X_{i,k}) = \frac{1}{\gamma}\log\{\kappa + \exp[-\gamma(X_{i,j} - X_{i,k}) - \kappa]\},$$

where:

$\gamma$ may denote a smoothing parameter, an amount of smoothing of the loss function may be increased as a value of the smoothing parameter $\gamma$ increases, $\kappa$ may denote a loss parameter, a value of $\kappa$ may be adjusted to affect a location of the loss function, i may denote an i-th row of matrix X, j may denote an j-th column of matrix X, and k may denote an k-th row of matrix X.

In an example, prediction module 130 may be configured to solve the below objective function, which may be indicated by prediction instruction 114:

$$\min_{X \in \mathbb{R}^{M \times N}} \lambda |X|_* + \sum_{(i,j,k) \in \Omega} l(X_{i,j} - X_{i,k}),$$

to determine predicted ratings for set of objects 210. The above objective function corresponds to an objective of minimizing a sum of the matrix rank of the output (matrix X), and minimizing a loss function (e.g., the smoothed log-loss function mentioned in paragraph 27 above). Prediction module 130 may be configured to determine matrix X, or prediction data 132, by assigning arbitrary values to each element of matrix X until the objectives (e.g., minimizing rank and loss function) are met. In an example, in a first attempt, prediction module 130 may assign a first set of values to each element of matrix X, and determine a first rank and a first loss based on the first assigned set of values. Subsequently, in a second attempt, prediction module 130 may assign a second set of values to each element of matrix X, and determine a second rank and a second loss based on the second assigned set of values. Prediction module 130 may continue to assign subsequent sets of values to matrix X, then compare all the determined ranks and losses in order to identify a set of elements of matrix X that results in a lowest rank and loss. The set of elements identified by prediction module 130 may be the predicted ratings that may be populated as entries of prediction data 132. In some examples, in order to determine elements of matrix X, or predicted ratings of set of objects 210, prediction module 130 may also apply preferential data 122 as a constraint when solving the above objective function. In an example, since preferential data 122 indicates "C>A", or object "C" is preferred over object "A", prediction module 130 may determine matrix X based on a condition that a value of the element $X_{1,3}$ (object "C") must be greater than a value of the element $X_{1,1}$ (object "A"). For example, prediction module 130 may assign a set of values to elements of matrix X where element $X_{1,3}$ is greater than element $X_{1,1}$.

In some examples, prediction instruction 114 may indicate one or more conditions or constraints in order to implement computer system 100 and in order to generate prediction data 132. For example, prediction instruction 114 may indicate a minimum number of observed objects, such as a minimum of one hundred objects, in order to generate prediction data 132. A number of observed objects may be a number of objects indicated by input data 104, such as an object that have a score, or an object that was compared in a pairwise comparison. Other examples of conditions or constraints may include defining a minimum matrix rank, or defining a particular order of complexity, etc.

Upon determining a matrix X (as mentioned above) that satisfies the objectives of the objective function indicated by prediction instruction 114, prediction module 130 may populate entries of prediction data 132, such as by populating elements of matrix X, to generate prediction data 132. Prediction data 132 may include the determined predicted ratings for the subset of objects that corresponds to preferences indicated by preferential data 122, and also for the subset of objects where preferences are excluded from preferential data 122. The predicted ratings indicated by prediction data 132 may be indicate a score, or a level of preference, of each object among set of objects 210.

In the example shown in FIG. 2, based on input data 104 provided by user 101, predicted ratings for set of objects 210 that corresponds to user 101 may be "1.3", "1.4", "2.6", "0.2", "1.1". In examples where objects among set of objects 210 are movie titles, input data 104 may indicate that user 101 prefers movie "C" over movie "A", prefers movie "A" over movie "D", but has not watched movies "B" and "E". By using prediction module 130 to generate prediction data 132, a predicted rating for movies "B" and "E", which are excluded from preferential data 122, may be estimated for user 101.

Similarly, in examples where objects among set of objects 210 are computer skills, input data 104 may indicate that user 101 is more knowledgeable in skill "C" over skill "A", and is more knowledgeable in skill "A" over skill "D", but the skill level for skills "B" and "E" are unknown. By using prediction module 130 to generate prediction data 132, a predicted skill rating for skills "B" and "E", which are excluded from input data 104, may be estimated for user 101. Further, prediction data 132 may include predicted ratings such that the predicted ratings may continue to satisfy the preferences indicated in preferential data 122. For example, a predicted rating for object "C" determined for user 101 is greater than a predicted rating for object "A" determined for user 101, which satisfies the preference of object "C" over object "A" as indicted by preferential data 122.

Prediction module 130 may store prediction data 132 in memory 112, and may send prediction data 132 to optimization module 140. Optimization module 140 may receive prediction data 132 from prediction module 130. Optimization module 140 may generate recommendation data 142 based on prediction data 132. For example, if user 101 requests a recommendation for movies (e.g., objects among set of objects 210), optimization module 140 may rank objects among set of objects 210 based on the predicted ratings in prediction data 132. In the example shown in FIG. 2, optimization module 140 may generate recommendation data 142a to shown that movie "C" has a highest predicted rating, then movie "B", movie "A", movie "E", and lastly, movie "D". By ranking objects based on predicted ratings in prediction data 132, recommendation data 142 may recommend movie "B" to user over movie "E" since movie "B" is of a relatively higher predicted rating than movie "E". Optimization module 140 may send recommendation data 142 that includes rankings of set of objects 210 to device 102 in order to recommend objects, based on the object rankings, to user 101. Similarly, optimization module 140 may rank set of objects 210 for user 201 to generate recommendation data 142 associated with user 201, such that each user 101, 201 may receive respective recommendations based on preferences provided as input data 104.

Optimization module 140 may also generate recommendation data 142 to identify one or more particular users based on prediction data 132. For example, user 101 may request an identification of a user who may have a relatively high rating for object "B". Optimization module 140 may analyze prediction data 132 and, in response, identify user 201 as having a relatively high predicted rating for object "B". Optimization module 140 may generate recommendation data 142 that identifies user 201 and may send recommendation data 142 to device 102 in order to recommend user 201 as a friend to user 101.

In another example, an employer of user 101 and user 201 may requests a recommendation to assign a task to either user 101 or user 201 based on skill levels of particular skills, such as skills "A" and "D". Optimization module 140 may generate recommendation data 142b to indicate that, based on the predicted ratings in prediction data 132, user 201 appears to be more knowledgeable in skills "A" and "D" than user 101. By ranking objects based on predicted ratings in prediction data 132, recommendation data 142 may recommend the employer to assign the task to user 201 instead of user 101.

In another example, optimization module 140 may be configured to determine a matrix rank of a matrix that may be outputted by processing prediction data 132. Upon a determination of a matrix rank, optimization module 140 may group particular objects and/or users based on the determined matrix rank. In some examples, optimization module 140 may determine the matrix rank of prediction data 132 in order to perform network clustering.

Figure 3:
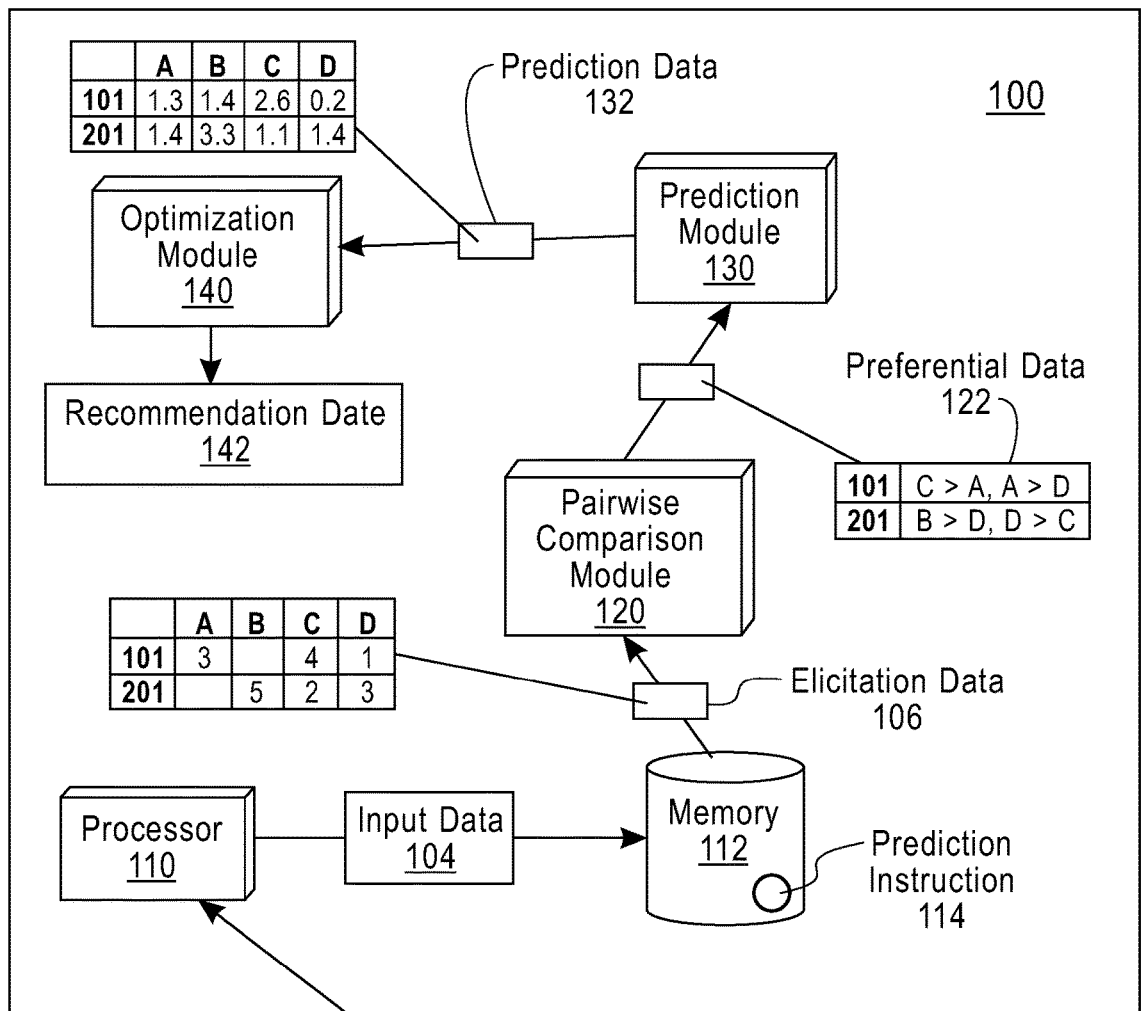
FIG. 3 illustrates an example computer system of FIG. 1 with additional detail relating to recommendation prediction with preference elicitation.

FIG. 3 illustrates an example system that can be utilized to implement recommendation prediction with preference elicitation. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

In some examples, input data 104 may include scores, selections, or time durations associated with at least a portion of set of objects 210. In an example shown in FIG. 3, input data 104 may include scores associated with a subset of set of objects 210. For example, input data 104 may include indications showing that user 101 gave a score of "3" to object "A", a score of "4" to object "C", and a score of "1" to object D. Processor 110 may receive input data 104 from device 102 and, in response, may store input data 104 in memory 112. User 101 may request generation of recommendation data 142 that corresponds to set of objects 210, such as by operating device 102 to send a request to processor 110.

Processor 110 may execute prediction instruction 114 to generate elicitation data 106 based on one or more pieces of input data 104 stored in memory 112. In an example, prediction instruction 114 may further include instructions relating to generation of a matrix S, where matrix S may be a matrix including M rows and N columns, and may be outputted by processing elicitation data 106. In an example, prediction instruction 114 may include an instruction to map one or more pieces of input data 104 (denoted as a matrix A below) to entries of matrix S in order to generate elicitation data 106. For example, a mapping instruction denoted as:

$$S_{i,j} = A_{i,j}, \forall (i,j) \in \Omega,$$

may be a part of prediction instruction 114, where $\Omega$ may denote a set of indices i, j, that corresponds to rows and columns, respectively, of entries among matrix A that are observed or filled. Using the example shown in FIG. 3 as an illustrative, input data 104 provided by user 101 and indicating "C:4" may indicate a score of "4" in "row 1" (user 101) and "column 3" (object "C"), such that an entry at $A_{1,3}$ includes a value, or is observed, and such that $A_{1,3}$ may be mapped to $S_{1,3}$. An entry such as $A_{1,2}$, corresponding to "row 1" and "column 2" may not be analyzed and mapped because $A_{1,2}$ is unfilled, or unobserved. The mapping instruction shown above may set a constraint on an implementation of computer system 100 such that only objects including information, provided in the form of input data 104, are analyzed, without a need to analyze objects without information. As such, a scalability of computer system 100 may be improved as less input data is being analyzed, thus may reduce usage of processing time and power. Processor 110 may continue to map observed entries from A to matrix S in order to generate elicitation data 106.

Processor 110 may instruct pairwise comparison module 120 to retrieve elicitation data 106 from memory 112. In some examples, elicitation data 106 may further include scores indicated by input data 104 from one or more different users, such as user 201. Pairwise comparison module 120 may be configured to generate preferential data 122 based on elicitation data 106. For example, pairwise comparison module 120 may perform a pairwise comparison between scores of each pair of objects among set of objects 210, and/or by executing prediction instruction 114 stored in memory 112.

In the example shown in FIG. 3, pairwise comparison module 120 may compare score "3" of object "A" with a score "4" of object "C" provided by user 101. As a result of the pairwise comparison, pairwise comparison module 120 may identify object "C" as a preferred object among the pair of objects "C" and "A". Similarly, pairwise comparison module 120 may compare score "4" of object "C" with a score of "1" of object "D" provided by user 101. As a result of the pairwise comparison, pairwise comparison module 120 may identify object "C" as a preferred object among the pair of objects "C" and "D". Upon a completion of pairwise comparisons between each pair of objects, indicated by input data 104, among set of objects 210, and for each corresponding user, pairwise comparison module 120 may compile the pairwise comparison results to generate preferential data 122.

In another example, input data 104 may include a number of selections of one or more objects among set of objects 210. For example, input data 104 may include data associated with a shopping history of user 101 on an online retailer website, such as transaction data. Input data 104 may indicate that user 101 viewed all objects among set of objects 210, but selected objects "A", "C", and "D" to purchase. In some examples, processor 110 may convert input data 104 that indicates selections into elicitation data 106, such that elicitation data 106 may indicate scores for each selected object. In some examples, input data 104 may indicate a number of times user 101 has purchased particular objects. If object "A" was purchased three times and object "C" was purchased four times, pairwise comparison module 120 may identify object "C" as the preferred object among the pair of objects "A" and "C". Upon a completion of pairwise comparisons between each pair of objects among set of objects 210, and for each corresponding user, pairwise comparison module 120 may compile the pairwise comparison results to generate preferential data 122.

In another example, input data 104 may include a duration of time associated with each object among set of objects 210. For example, input data 104 may include data associated with a web browsing history of user 101, such as click-through data. Input data 104 may indicate that user 101 viewed a website (an object) "A" for eight minutes, website "C" for fifteen minutes, and website "D" for three minutes. Processor 110 may convert input data 104 that indicates the time duration into elicitation data 106, such that elicitation data 106 may indicate scores for each selected object. For example, elicitation data 106 may indicate a score of "15" for object "A", a score of "8" for object C, and a score of "3" for object D. Pairwise comparison module 120 may compare scores (indicated by elicitation data 106) of each pair of objects to generate preferential data 122. Upon a completion of pairwise comparisons between each pair of objects among set of objects 210, and for each corresponding user, pairwise comparison module 120 may compile the pairwise comparison results to generate preferential data 122.

A system in accordance with the present disclosure may benefit recommendation systems by generating predicted ratings of a set of objects when information of a subset of the set of objects is available. In some examples, matrix completion techniques are used as an effective technique for collaborative filtering and recommendation systems. Typically, standard approaches to matrix completion require numerical ratings of items. In various instances, pairwise comparisons of items may be easier to elicit than numerical ratings. For example, pairwise comparisons of webpages may be generated based on the time stayed on webpages. Further, pairwise comparisons may not suffer from differences in scale, shift, and variance. By using pairwise comparison results as input, a system in accordance with the present disclosure may predict matrix completion-based numerical ratings while never constructing a pairwise comparison matrix with a quadratic number of columns.

In some examples, it may be difficult to obtain ratings, reviews, and/or activities relating to a set objects that may include thousands of objects. A system in accordance with the present disclosure may allow a recommendation system to predict ratings for the set of thousands of objects based on information of a subset of objects, without a need to collect information on every object. For example, if there are N users and M objects to recommend, at least a complexity of $O(\max(N,M)*\log(\max(N,M))^2)$ entries may be sufficient to complete a matrix reflecting prediction data that may be used to generate the recommendations. A system in accordance with the present disclosure may estimate ratings for objects that may lack a score, rating, preference, or any information from one or more users. Further, a system in accordance with the present disclosure provides a platform for recommendation systems to predict ratings for a set of objects based on preferences of users, instead of based on numerical ratings, when numerical ratings may be unavailable. Still further, a system in accordance with the present disclosure may improve efficiency in recommendation systems and/or cloud analytics platform. For example, since information for every single object within a set of objects may not be necessary to generate predicted ratings, a recommendation system may use less time to retrieve inputs from a database because less inputs are necessary. A matrix being outputted based on the predicted ratings generated in a system in accordance with the present disclosure may be of a relatively low matrix rank, such that the predicted ratings may provide relatively more accurate recommendation of various objects to users. In some examples, by having a low-rank matrix as output, a relatively small portion of entries in a matrix may be observed to recover a relatively large matrix. In some examples, by having a low-rank matrix as output, computation cost may be reduced due to a significant amount of rows and columns of the matrix being linearly dependent.

Figure 4:
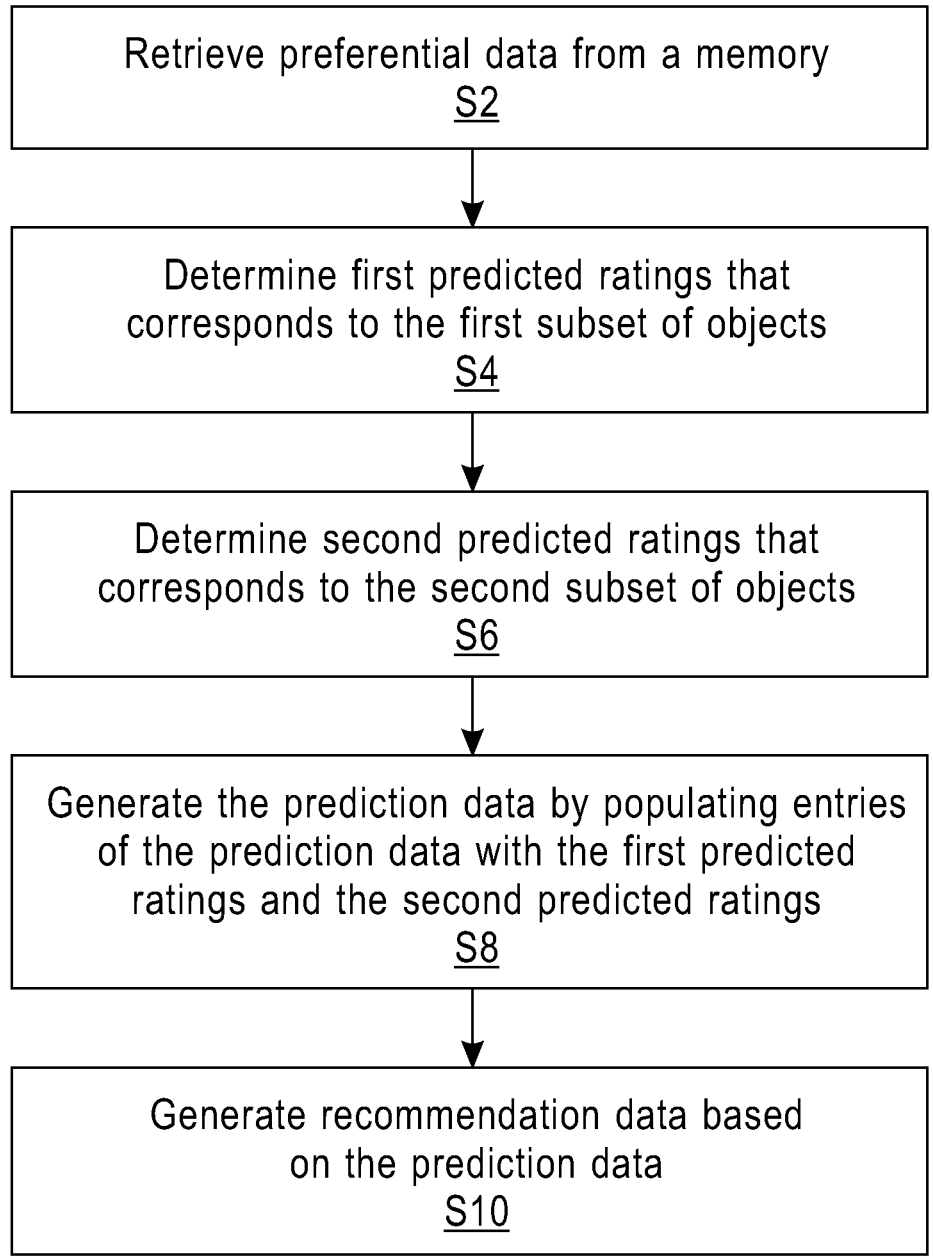
FIG. 4 illustrates a flow diagram for an example process to implement recommendation prediction with preference elicitation.

FIG. 4 illustrates a flow diagram for an example process to implement recommendation prediction with preference elicitation, arranged in accordance with at least some embodiments presented herein. The process in FIG. 4 could be implemented using, for example, computer system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Retrieve preferential data from a memory". At block S2, a processor may retrieve preferential data from a memory. The preferential data may include a set of preferences that corresponds to a first subset of objects among a set of objects. Each preference among the set of preferences may be indicative of a preferred object between a respective pair of objects among the first subset of objects. The preferential data may exclude preferences associated with a second subset of objects among the set of objects.

Processing may continue from block S2 to block S4, "Determine first predicted ratings that corresponds to the first subset of objects". At block S4, the processor may determine first predicted ratings, that correspond to the first subset of objects, based on the preferential data. In some examples, determination of the first predicted ratings may include an application of the preferential data as an input to a smooth log-loss technique.

Processing may continue from block S4 to block S6, "Determine second predicted ratings that corresponds to the second subset of objects". At block S6, the processor may determine second predicted ratings, that corresponds to the second subset of objects, based on the preferential data. In some examples, determination of the second predicted ratings may include an application of the preferential data as an input to the smooth log-loss technique.

Processing may continue from block S6 to block S8, "Generate the prediction data by populating entries of the prediction data with the first predicted ratings and the second predicted ratings". At block S8, the processor may populate entries of the prediction data with the first predicted ratings and the second predicted ratings. As a result of populating prediction data with the first and second predicted ratings, the predication data may include predicted ratings for the set of objects.

Processing may continue from block S8 to block S10, "Generate recommendation data based on the prediction data". At block S10, an optimization module may generate recommendation data based on the prediction data. In some examples, the processor may send the prediction data to an optimization module in order for the optimization module to generate the recommendation data. In some examples, the recommendation data may identify one or more objects among the set of objects. An object being identified by the recommendation data may be an object to be recommended to a user.

Figure 5:
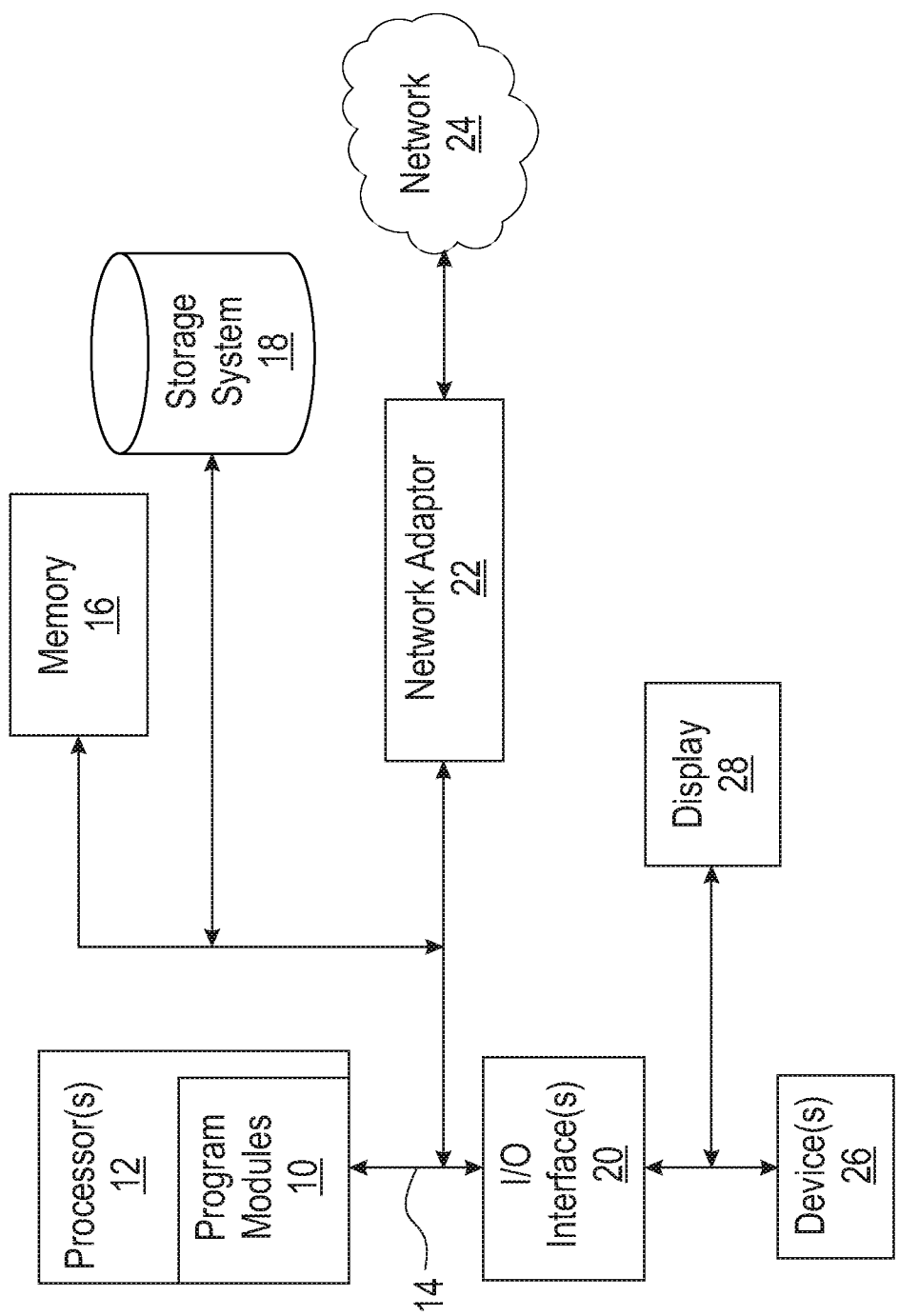
FIG. 5 is an exemplary block diagram of a computer system in which processes involved in the system, method, and computer program product described herein may be implemented.

FIG. 5 illustrates a schematic of an example computer or processing system that may implement any portion of computer system 100, processor 110, memory 112, pairwise comparison module 120, prediction module 130, optimization module 140, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating prediction data in a recommendation system, the method comprising:
   retrieving, by a processor of the recommendation system, preferential data from a memory, wherein:
      the preferential data includes a set of preferences that corresponds to a first subset of objects among a set of objects,
      each preference among the set of preferences is indicative of a preferred object between a respective pair of objects among the first subset of objects; and
      the preferential data excludes preferences associated with a second subset of objects among the set of objects;
   determining, by the processor of the recommendation system and based on the preferential data, first predicted ratings that corresponds to the first subset of objects;
   determining, by the processor of the recommendation system and based on the preferential data, second predicted ratings that corresponds to the second subset of objects having preferences excluded from the preferential data, wherein determining the first and second predicted ratings includes applying the preferential data as a constraint to an objective function and solving the objective function;
   generating, by the processor of the recommendation system, the prediction data by populating entries of the prediction data with the first predicted ratings and the second predicted ratings, wherein the prediction data includes predicted ratings of the first subset of objects among the set of objects, and the prediction data also includes predicted ratings of the second subset of objects having preferences excluded from the preferential data;
   sending, by the processor of the recommendation system, the prediction data to an optimization module of the recommendation system; and
   generating, by the optimization module of the recommendation system, recommendation data based on the prediction data, wherein the recommendation data identifies at least an object among the set of objects.

2. The method of claim 1, wherein the recommendation data indicates a ranking of the set of objects based on the predicted ratings of the set of objects.

3. The method of claim 1, further comprising, prior to retrieving the preferential data by the processor:
   retrieving, by a pairwise comparison module of the recommendation system, elicitation data from the memory, wherein the elicitation data includes partially observed entries associated with the first subset of objects among the set of objects;

comparing, by the pairwise comparison module of the recommendation system, each respective pair of objects among the first subset of objects indicated by the elicitation data;

identifying, by the pairwise comparison module of the recommendation system and based on the comparison of each respective pair of objects, respective preferred objects between each respective pair of objects among the first subset of objects;

generating, by the pairwise comparison module of the recommendation system, the preferential data based on the identified preferred objects; and storing, by the pairwise comparison module of the recommendation system, the preferential data in the memory.

4. The method of claim 3, wherein the elicitation data includes scores for each object among the first subset of objects.

5. The method of claim 3, wherein the elicitation data indicates respective time durations associated with the first subset of objects.

6. The method of claim 3, wherein the elicitation data indicates one or more selections related to the first subset of objects among the set of objects.

7. The method of claim 1, wherein the objective function relates to a smooth log-loss technique.

8. A system effective to generate prediction data, the system comprising:
  a memory configured to store a prediction instruction;
  a prediction module configured to be in communication with the memory, the prediction module being configured to:
    retrieve preferential data from the memory, wherein:
      the preferential data includes a set of preferences that corresponds to a first subset of objects among a set of objects,
      each preference among the set of preferences is indicative of a preferred object between a respective pair of objects among the first subset of objects; and
      the preferential data excludes preferences associated with a second subset of objects among the set of objects;
    determine, based on the preferential data, first predicted ratings that corresponds to the first subset of objects;
    determine, based on the preferential data, second predicted ratings that corresponds to the second subset of objects having preferences excluded from the preferential data, wherein the determination the first and second predicted ratings includes an application of the preferential data as a constraint to an objective function and solving the objective function; and
    populate entries of the prediction data with the first predicted ratings and the second predicted ratings to generate the prediction data, wherein the prediction data includes predicted ratings of the first subset of objects among the set of objects, and the prediction data also includes predicted ratings of the second subset of objects having preferences excluded from the preferential data;
  an optimization module configured to be in communication with the memory and the prediction module, the optimization module being configured to:
    receive the prediction data from the prediction module; and
    generate recommendation data based on the prediction data, wherein the recommendation data identifies at least an object among the set of objects.

9. The system of claim 8, wherein the recommendation data indicates a ranking of the set of objects based on the predicted ratings of the set of objects.

10. The system of claim 8, further comprising a pairwise comparison module configured to be in communication with the memory and the prediction module, the pairwise comparison module being configured to:
  retrieve elicitation data from the memory, wherein the elicitation data includes partially observed entries associated with the first subset of objects among the set of objects;
  compare each respective pair of objects among the first subset of objects indicated by the elicitation data;
  identify, based on the comparison of each respective pair of objects, respective preferred objects between each respective pair of objects among the first subset of objects;
  generate the preferential data based on the identified preferred objects; and
  store the preferential data in the memory.

11. The system of claim 8, wherein the elicitation data includes scores for each object among the first subset of objects.

12. The system of claim 8, wherein the elicitation data indicates respective time durations associated with the first subset of objects.

13. The system of claim 8, wherein the elicitation data indicates one or more selections related to the first subset of objects among the set of objects.

14. The system of claim 8, wherein the objective function relates to a smooth log-loss technique.

15. A computer program product for generating prediction data in a recommendation system, the computer program product comprising a computer readable storage medium having program instructions embodied therewith, the program instructions executable by a device to cause the device to:
  retrieve preferential data from a memory, wherein:
    the preferential data includes a set of preferences that corresponds to a first subset of objects among a set of objects,
    each preference among the set of preferences is indicative of a preferred object between a respective pair of objects among the first subset of objects; and
    the preferential data excludes preferences associated with a second subset of objects among the set of objects;
  determine, based on the preferential data, first predicted ratings that corresponds to the first subset of objects;
  determine, based on the preferential data, second predicted ratings that corresponds to the second subset of objects having preferences excluded from the preferential data, wherein determining the first and second predicted ratings includes applying the preferential data as a constraint to an objective function and solving the objective function;
  generate the prediction data by populating entries of the prediction data with the first predicted ratings and the second predicted ratings, wherein the prediction data includes predicted ratings of the first subset of objects among the set of objects, and the prediction data also includes predicted ratings of the second subset of objects having preferences excluded from the preferential data; and generate recommendation data based on the prediction data, wherein the recommendation data identifies at least an object among the set of objects.

16. The computer program product of claim 15, wherein the program instructions are further executable by the device to cause the device to:
retrieve elicitation data from the memory, wherein the elicitation data includes partially observed entries associated with the first subset of objects among the set of objects;
compare each respective pair of objects among the first subset of objects indicated by the elicitation data;
identify, based on the comparison of each respective pair of objects, respective preferred objects between each respective pair of objects among the first subset of objects;
generate, the preferential data based on the identified preferred objects; and
store the preferential data in the memory.

17. The computer program product of claim 15, wherein the objective function relates to a smooth log-loss technique.

* * * * *